(12) United States Patent
Chang

(10) Patent No.: US 7,008,012 B1
(45) Date of Patent: Mar. 7, 2006

(54) REMOVABLE BICYCLE SEAT AND CARRYING CASE

(76) Inventor: Thomas Chang, 2 Wheaton Center, Unit 1612, Wheaton, IL (US) 60187

(*) Notice: Subject to any disclaimer, the term of this patent is extended or adjusted under 35 U.S.C. 154(b) by 0 days.

(21) Appl. No.: 10/945,681

(22) Filed: Sep. 21, 2004

(51) Int. Cl.
*B62J 1/28* (2006.01)

(52) U.S. Cl. ............... 297/188.1; 297/195.1; 297/129

(58) Field of Classification Search ............. 297/183.5, 297/188.1, 195.1, 129; 224/412, 413, 415, 224/417, 418
See application file for complete search history.

(56) References Cited

U.S. PATENT DOCUMENTS

| | | | |
|---|---|---|---|
| 603,734 A | | 5/1898 | Peck et al. |
| 718,850 A | | 1/1903 | Kruseman |
| 3,625,405 A | * | 12/1971 | Kezar et al. ............... 224/413 |
| 3,771,827 A | | 11/1973 | Winfree |
| 4,367,829 A | * | 1/1983 | Kusz ..................... 297/215.11 |
| 5,234,143 A | * | 8/1993 | Mahvi et al. ............... 224/415 |
| 5,423,462 A | * | 6/1995 | Dickhaus ..................... 224/415 |
| 5,577,646 A | * | 11/1996 | White ....................... 224/422 |
| 6,113,184 A | | 9/2000 | Barnes |
| 6,152,524 A | | 11/2000 | Cox |

* cited by examiner

*Primary Examiner*—Peter R. Brown
(74) *Attorney, Agent, or Firm*—Mark E. Wiemelt

(57) ABSTRACT

A conveniently removable bicycle seat with interior storage space that converts into a carrying case is disclosed. The bicycle seat is comprised of upper and lower support members which are attached to a hinged plate in a clamshell design. The bicycle seat is removably attached to a bicycle frame with an attachment means in the underside of the lower support member. When removed from the bicycle frame, the bicycle seat acts as a carrying case for the storage and transport of various personal items. The upper and lower support members may be removed from the hinged plate and interchanged with other support members of varying shapes, sizes and designs to suit the physical and aesthetic needs of the bicyclist. The seat includes an indentation in the front center region of the seat to alleviate any potential pressure on the genitalia.

11 Claims, 6 Drawing Sheets

REMOVABLE BICYCLE SEAT AND CARRYING CASE

BACKGROUND OF THE INVENTION

1. Field of the Invention

The present invention relates to bicycle seats, and, more particularly, to a bicycle seat that includes an indentation in the front center region of the seat to alleviate any potential pressure on the genitalia, and which contains interior storage compartments, interchangeable seating elements of various sizes and designs, and can be conveniently removed from the bicycle frame and converted into a carrying case.

2. The Prior Art

Typically, bicycles are sold with conventional saddle seats. A problem with these seats is that they provide no means of storage for the rider's personal items. A wallet, keys, ID or a cell phone are just a few of the items a rider may wish to carry along on the ride, and it would be advantageous to have a place to store them without having to go to the trouble and expense of purchasing and installing a separate saddle bag for the bicycle. A means of storing such articles in the seat itself would be seen as a benefit by many bicyclists. An even greater benefit would be obtained if the seat were conveniently detachable from the bicycle so that it could be used as a carrying case.

Another problem with conventional saddle seats is that many riders find them uncomfortable. The area of contact between the rider and the seat is relatively small, thereby putting a great deal of pressure on the body parts in direct contact with the seat. This frequently leads to discomfort in the areas of contact, both through the compression of the body parts bearing weight during the ride and through abrasion of the inner thighs against the saddle while pedaling. Prolonged riding on saddle-type seats has even been known to cause damage to both male and female reproductive organs. An alternative to the conventional saddle seats would be welcomed by many bicyclists.

It would be advantageous to have the ability to quickly and conveniently substitute a bicycle seat with the requisite size, shape and shock absorbing characteristics to suit the physical needs of the individual rider. It would also be advantageous to have the ability to change the seat to suit the aesthetic preferences of the rider and to substitute seats of various colors, patterns or motifs to reflect the individual tastes of the rider.

SUMMARY OF THE INVENTION

The present invention is a bicycle seat with removable support members and interior compartments for the storage and transport of personal articles. The bicycle seat can also be removed from the bicycle frame to act as a carrying case.

The bicycle seat is a clamshell design composed of two support members removably attached to a hinged plate. The upper support member is padded and interfaces with the rider to provide cushion and support. The upper support member may be decorated in any desired manner. The lower support member contains compartments in its interior to hold various items. The underside of the lower support member contains a means by which to secure the seat to the bike frame. In the preferred embodiment, the lower support member contains a collar into which the seat post from the bicycle frame is slidably received. The seat is locked in place by a quick release mechanism that tightens the collar around the seat post. This mechanism allows the bicycle seat to readily removed when so desired.

The support members are removably attached to the hinged plate. Although various means of attachment are contemplated, the preferred embodiment uses a tongue-in-groove connection as a means of attachment. The removability of the support members allows varying styles and designs of bicycle seats to be interchanged according to the individual preferences of the rider.

The clamshell design and hinged plate allow the seat to be opened while mounted to the bicycle. With the lower support member secured to the bicycle frame, the upper support member pivots upward and allows access to the compartments housed in the interior of the lower support member. The interior of the lower support member may contain one large compartment or be further subdivided into smaller, more specialized compartments designed to hold specific items such as a cell phone, wallet or keys. The seat is secured in the closed position by a locking means such as a clasp, spring, hook, or other conventional locking means.

The seat is readily removable from the bicycle frame for use as a carrying case. When so used, the bicycle seat may contain a component to aid in carrying the seat. For example, a handle may be built into the lower support member or the upper support member, or straps may be affixed to the lower support member or the upper support member so that the seat may be carried like a backpack.

It is an object of this invention to provide a bicycle seat with useful interior compartments for the convenient transport and storage of various personal articles.

It is an object of this invention to provide a bicycle seat with interchangeable support members so that the style, shape and size of the seat may be readily changed to suit the physical and aesthetic needs of the individual rider.

It is a further object of this invention to provide a bicycle seat that converts into a carrying case for the convenient and stylish transport of personal items.

It is an advantage of this invention to offer a seat with support members that are adaptable to the changing physical and aesthetic needs of the rider.

It is an advantage of this invention that the storage compartments are built into the seat and eliminate the need for a separate saddle bag attached to the bicycle.

It is an advantage of this invention that use of properly sized and more comfortable bicycle seats will result in the improved health and comfort of the bicycle riding public.

Further objects and advantages of the present invention will become apparent to those skilled in the art to which the invention relates, from the following embodiments described with reference to the accompanying drawings, the specification and claims.

BRIEF DESCRIPTION OF THE DRAWINGS

The foregoing and other additional objects of the present invention will be readily appreciated by those skilled in the art upon gaining an understanding of the preferred embodiment as described in the following detailed description and shown in the accompanying drawings in which.

DETAILED DESCRIPTION OF THE PREFERRED EMBODIMENT

Figure 1:
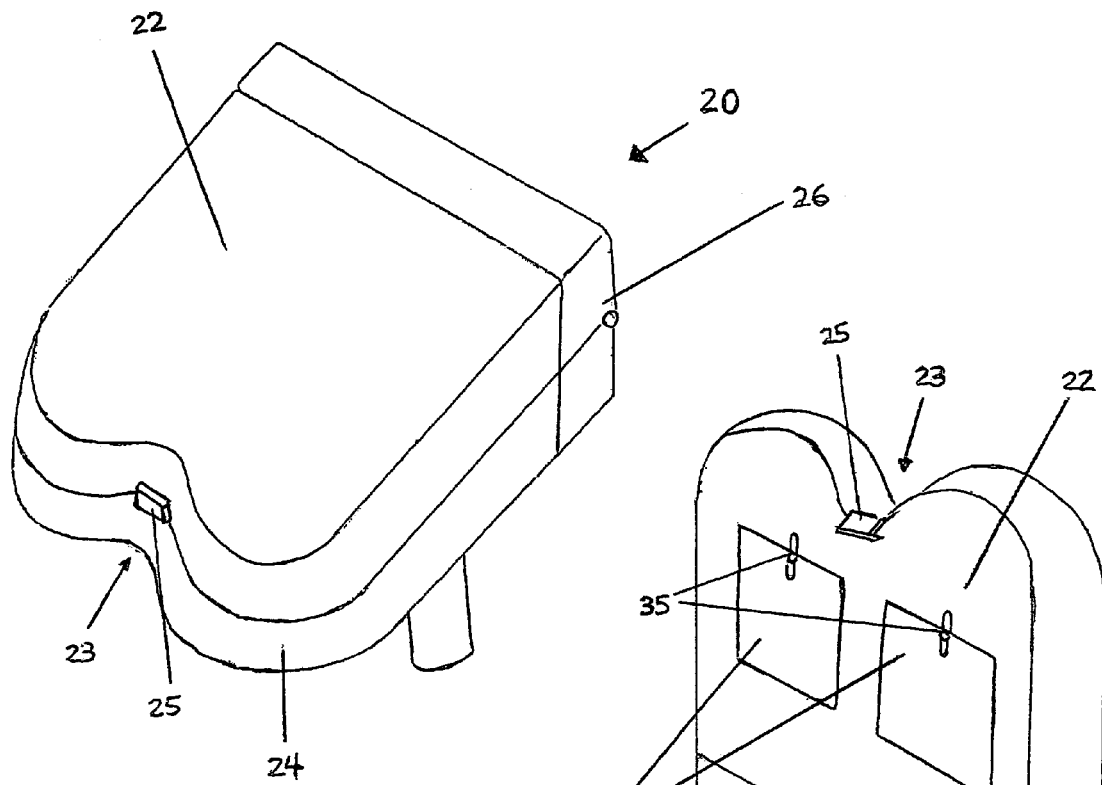
FIG. 1 is a perspective view showing the lower support member secured to the bicycle frame with the upper support member in the closed position and forming a bicycle seat.

While this present invention is susceptible of embodiments in many different forms, there are shown in the drawings and will be described in detail herein, a preferred embodiment, with like parts designated by like reference numerals and with the understanding that the present disclosure is to be considered as an exemplification of the principles of the present invention, and is not intended to limit the claims to the illustrated preferred embodiment.

The bicycle seat 20 is a clamshell design composed of an upper support member 22 and a lower support member 24 removably attached to a hinged plate 26. FIG. 1 shows a perspective view of the bicycle seat 20 with the lower support member 24 secured to the bicycle frame with the upper support member 22 in the closed position and forming a bicycle seat. The upper support member 22 is padded and interfaces with the rider to provide cushion and support. The shape and size of the upper and lower support members 22, 24 may be varied to fit the individual needs of the rider. FIG. 1 depicts the shape of the preferred embodiment, where the bicycle seat 20 is wider than conventional saddle-type seats and permits the distribution of weight across a wider area of the rider's body to reduce the pressure on any particular area. This particular shape also contains an indentation 23 in the front center region of the seat to alleviate any potential pressure on the genitalia. The upper and lower support members 22, 24 may also be decorated to suit the tastes of the rider and may employ various color schemes, motifs, cartoon characters and the like.

Figure 2:
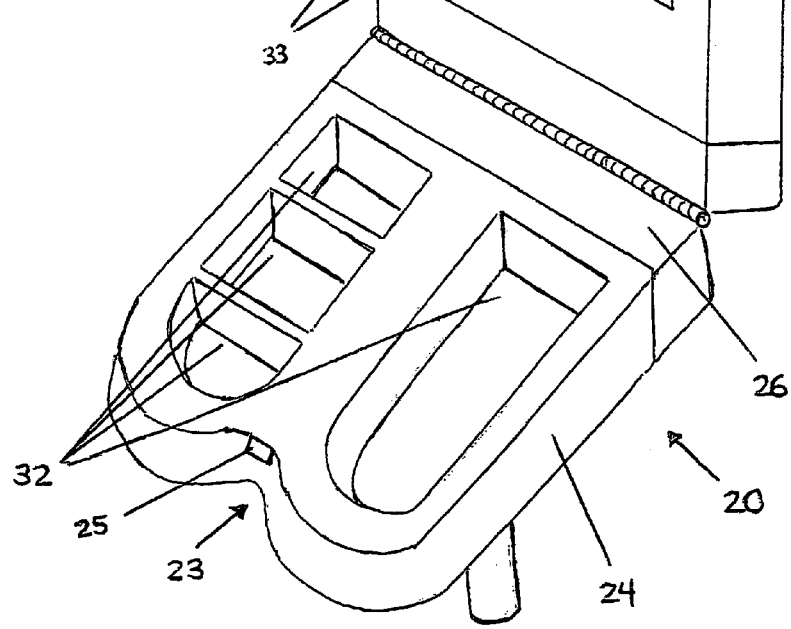
FIG. 2 is a perspective view illustrating the lower support member secured to the bicycle frame with the upper support member in the open position and showing the interior storage compartments.

Turning now to FIG. 2, the bicycle seat 20 is depicted with the upper support member 22 in the open position, permitting access to the interior compartments 32 housed in the lower support member 24. The interior of the lower support member 24 may contain one large, open compartment or be further subdivided into smaller, more specialized compartments designed to hold one or more items such as a cell phone, wallet, keys, toys, video games, CDs, first aid kits, currency, containers for storing food or liquid, or electronic devices. The bicycle seat 20 is secured in the closed position by a locking means such as a clasp 25 or a spring (not shown). These compartments 32 within the bicycle seat 20 provide a convenient and heretofore unseen way to store and transport personal items during a bicycle ride.

Figure 3:
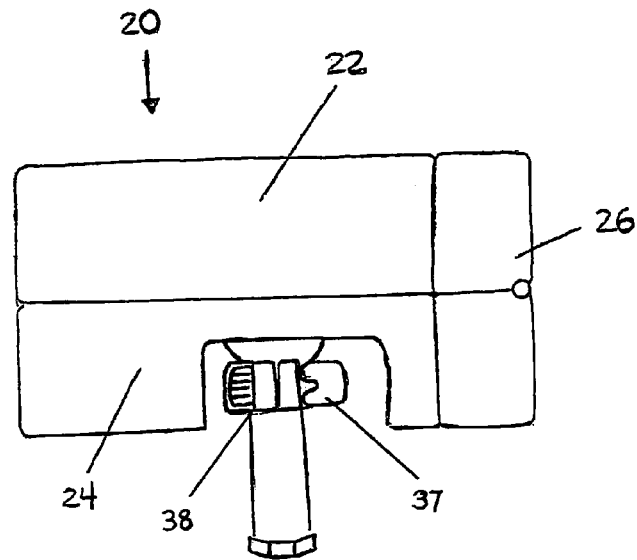
FIG. 3 is a side cut-away view showing the lower support member secured to the bicycle frame with the upper support member in the closed position and forming a bicycle seat.
Figure 4:
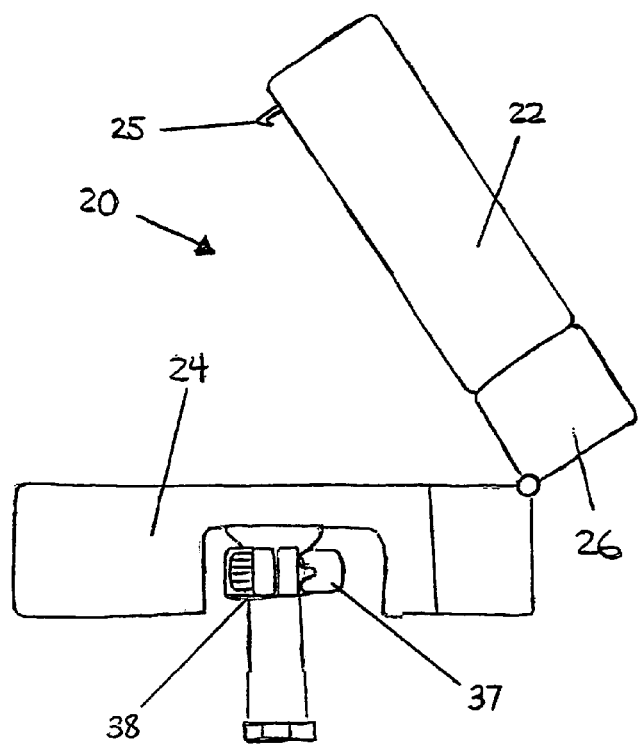
FIG. 4 is a side cut-away view of the lower support member secured to the bicycle frame with the upper support member in the open position for access to the interior compartments.

FIG. 3 is a side cut-away view showing the lower support member 24 secured to the bicycle frame with the upper support member 22 in the closed position and forming a bicycle seat. FIG. 4 is a side cut-away view of the lower support member secured to the bicycle frame with the upper support member in the open position for access to the interior compartments.

Figure 5:
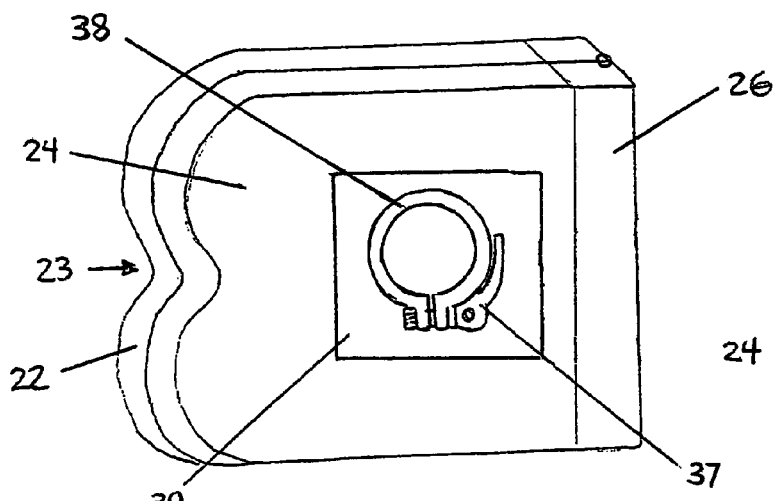
FIG. 5 is a perspective view showing the underside of the lower support member with its collar and quick release mechanism.

Referring now to FIG. 5, the underside of the lower support member 24 is shown to contain a means of attachment to the bicycle frame. In the preferred embodiment, attachment to the frame is accomplished using a collar 38 housed inside a cavity 39 in the underside of the lower support member 24. In this configuration, the collar 38 slidably receives a seat post 36 from the bicycle frame. The bicycle seat 20 is locked into place by a quick release mechanism 37 that tightens the collar 38 around the seat post 36. This configuration allows the entire seat 20 to be readily detached from the bicycle when so desired.

Figure 6:
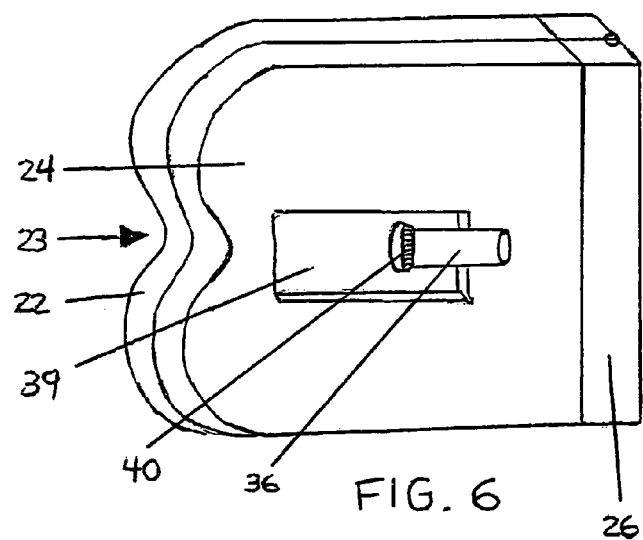
FIG. 6 is a perspective view illustrating the underside of the lower support member with a seat post built permanently into the lower support member and the seat post extending outward for attachment to the bicycle frame.
Figure 7:
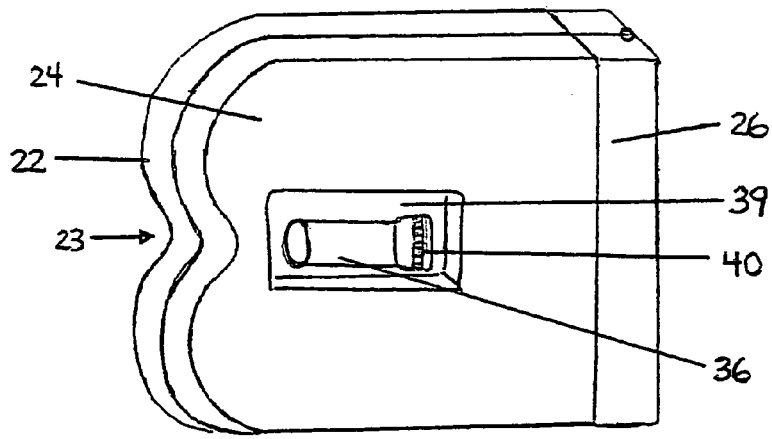
FIG. 7 is a perspective view of the underside of the lower support member with a seat post built permanently into the lower support member and the seat post folded inward during use of the seat as a carrying case.

In an alternative embodiment depicted in FIGS. 6 and 7, the underside of the lower support member 24 contains its own seat post 36. The seat post 36 contains a hinge 40 at its point of attachment to the underside of the lower support member 24 so that it may be extended for sliding into the bicycle frame when used as a seat as shown in FIG. 6, or retracted into the cavity 39 in the underside of the lower support member 24 when the bicycle seat 20 is being used as a carrying case as shown in FIG. 7.

Figure 8:
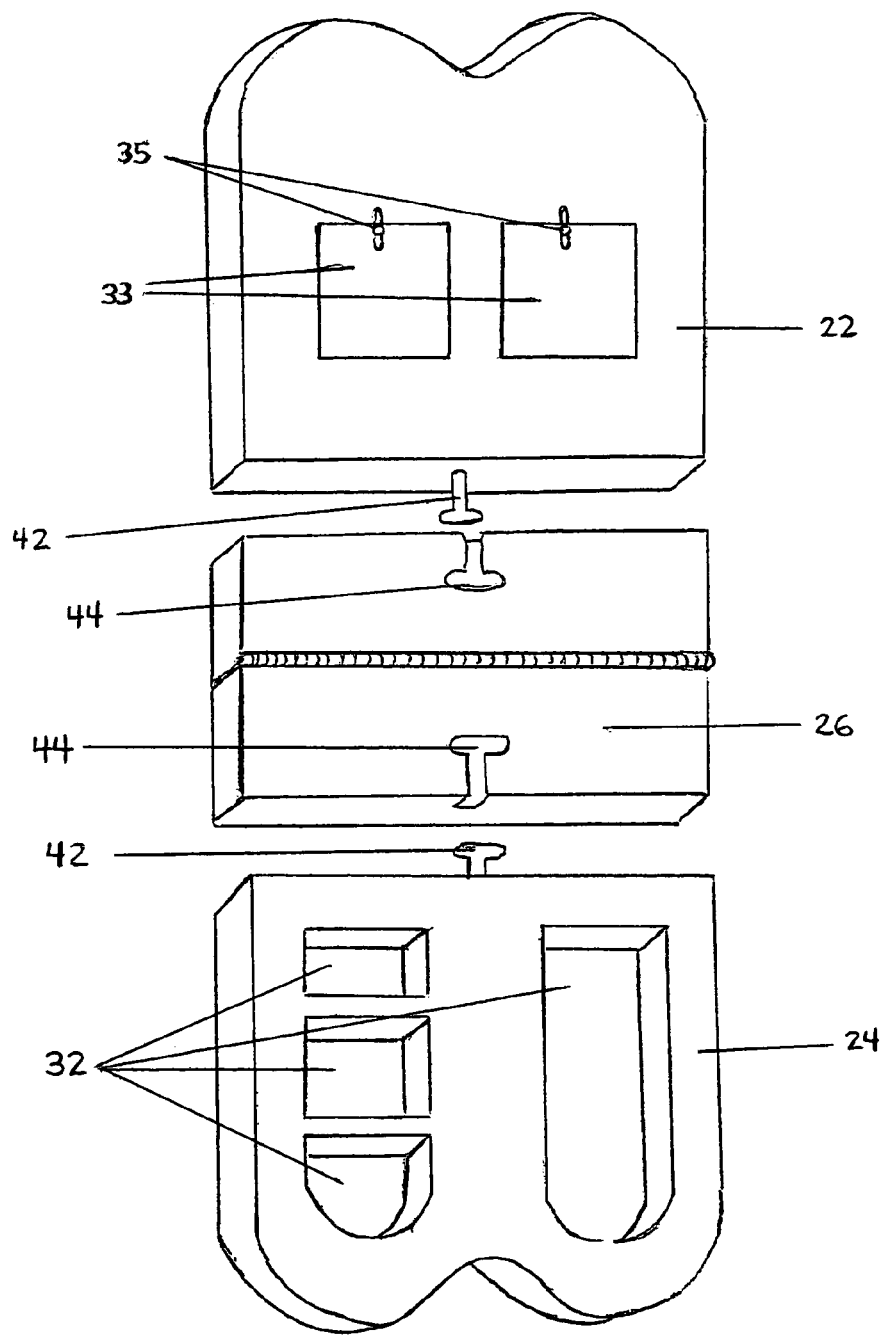
FIG. 8 is a schematic view illustrating the upper and lower support members attached to the hinged plate using a tongue-in-groove connection means.

The bicycle seat 20 contains a means by which to attach the upper and lower support members 22, 24 to the hinged plate 26. FIG. 8 illustrates the attachment means in the preferred embodiment wherein each of the upper and lower support members 22, 24 contains a tongue 42 which fits into and interlocks with a corresponding groove 44 in the hinged plate 26. Other attachment means are contemplated for this purpose, including screw, bolt or clamp-type assemblies. The removability of the upper and lower support members 22, 24 allows them to be interchanged with support members of varying shapes, styles and designs to cater to the individual rider's physical needs and aesthetic preferences.

Figure 9:
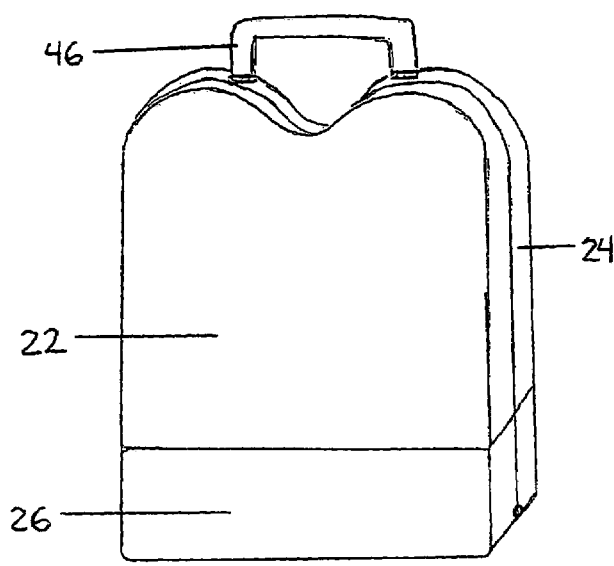
FIG. 9 is a perspective view of the bicycle seat removed from the bicycle frame for use as a carrying case with a handle.
Figure 10:
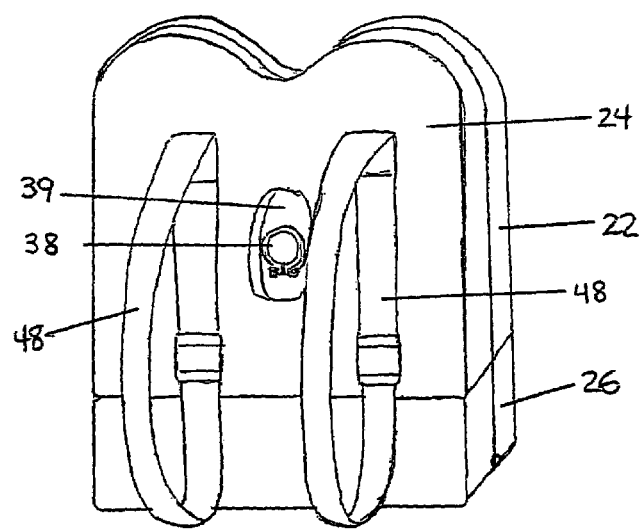
FIG. 10 is a perspective view of the bicycle seat removed from the bicycle frame for use as a backpack.

The bicycle seat 20 may also embody various straps or handles to make it easier to carry when in use as a carrying case. FIGS. 9 and 10 illustrate two such configurations. In FIG. 9, a handle 46 is attached to the lower support member 24. The handle 46 is preferably hinged at its points of attachment so that the handle falls downward and out of the way during use as a bicycle seat. FIG. 10 shows straps 48 attached to the underside of the lower support member 24 which allow the bicycle seat 20 to be carried in the manner of a backpack. It should be readily understood by one skilled in the art that the handle or straps could alternatively or additionally be attached to the upper support member 22.

Figure 11:
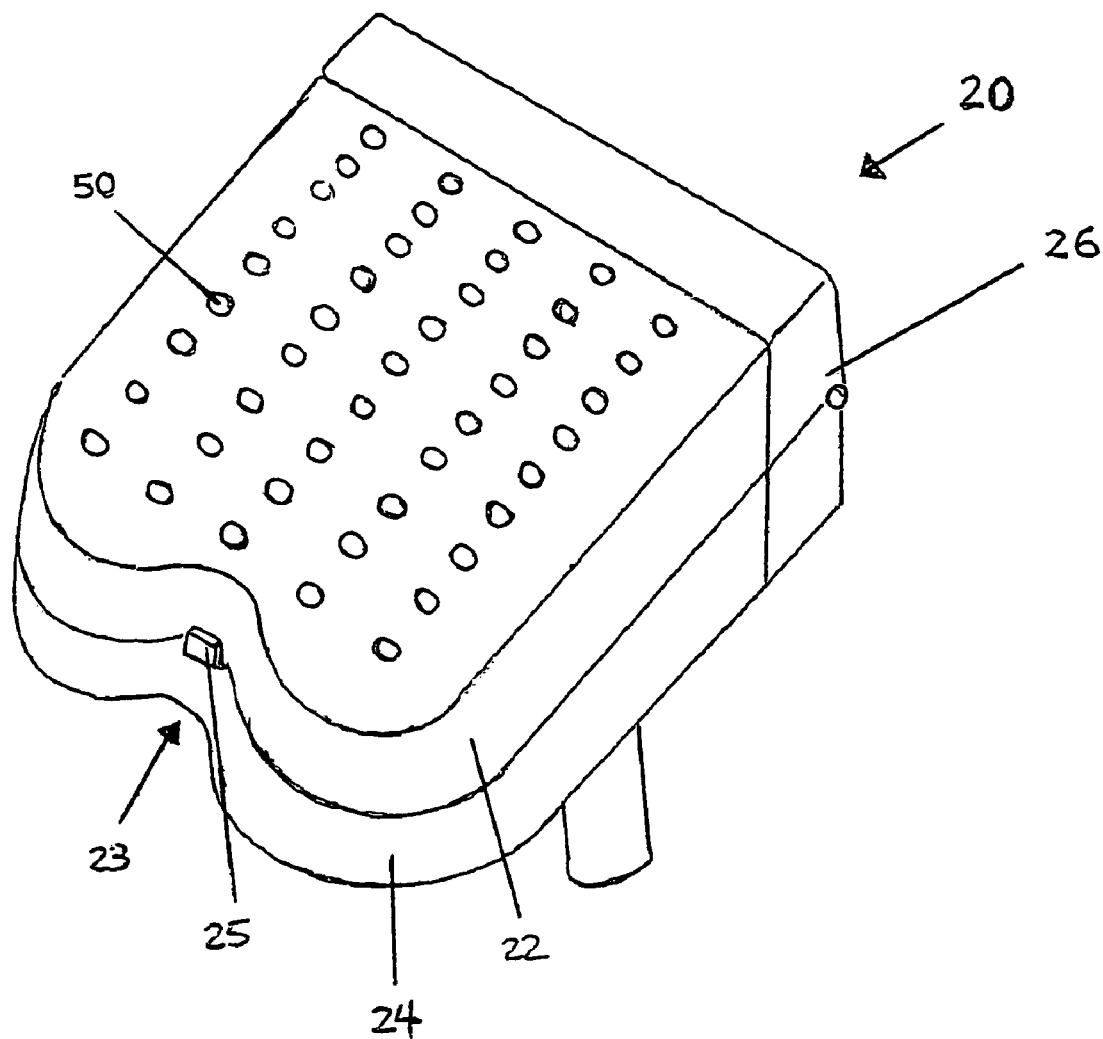
FIG. 11 is a perspective view of the bicycle seat containing ventilation holes in the upper support member to provide added comfort.

Certain styles and designs of bicycle seats 20 may also permit sufficient space for interior storage compartments 32 in the upper support member 22 in addition to those in the lower support member 24. This is particularly true of the larger seat designs which provide for adequate cushioning and support and still have room left over for interior storage compartments 32 in the upper support member 22. Additionally, as shown in FIG. 11, the bicycle seat 20 may contain ventilation holes 50 in the upper support member 22 for added comfort. It should be readily understood by those skilled in the art that the ventilation holes 50 may run vertically through the top of the upper support member 22, the ventilation holes 50 may exhaust through the sides of the upper support member 22, or the ventilation holes may exhaust though the bottom or sides of the lower support member 24. The ventilation holes may be used to receive therethrough one or more wires of one or more electronic devices which are stored in one or more of the interior storage compartments 32.

While the invention has been described in connection with a preferred embodiment, it will be understood that it is not intended that the invention be limited to that embodiment. On the contrary, it is intended to cover all alternatives, modifications and equivalents as may be included within the spirit and scope of the invention as disclosed.

As to the manner of usage and operation of the present invention, the same should be apparent from the above disclosure, and accordingly no further discussion relevant to the manner of usage and operation of the present invention shall be provided.

With respect to the above description then, it is to be realized that the optimum dimensional relationships for the parts of the present invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered illustrative of only the principles of the present invention. Further, since numerous modifications and changes will readily occur to those skilled in the art, it is not desired to limit the claims to the exact construction and operation shown and described, and accordingly, all suitable modifications and equivalents may be resorted to, falling within the scope of the claims. Therefore the foregoing is considered illustrative of the principles of the present invention.

What is claimed is:

1. A bicycle seat, comprising:
an upper support member; a lower support member; and a hinged plate;
the upper and lower support members attached to the hinged plate;
the lower support member containing one or more interior storage compartments;
the underside of the lower support member containing an attachment means for attaching the underside of the lower support member to a bicycle frame, wherein the upper and lower support members are attached to the hinged plate by means of a tongue-in-groove connection.

2. A bicycle seat, comprising:
an upper support member; a lower support member; and a hinged plate;
the upper and lower support members attached to the hinged plate;
the lower support member containing one or more interior storage compartments;
the underside of the lower support member containing an attachment means for attaching the underside of the lower support member to a bicycle frame, wherein the upper and lower support members are removably attached to the hinged plate by means of a tongue-in-groove connection; the attachment means for removably attaching the underside of the lower support member to the bicycle frame is a collar and quick release mechanism in which a seat post is slidably received; and further comprising a clasp to secure the upper and lower support members in the closed position; a handle to facilitate the carrying of the bicycle seat when removed from the bicycle frame; an indentation in the front center region of the seat; and ventilation holes in the upper support member.

3. The bicycle seat of claim 2 wherein at least one of the ventilation holes may be used to receive therethrough one or more wires of one or more electronic devices which are stored in one or more of the interior storage compartments.

4. A bicycle seat, comprising:
an upper support member; a lower support member; and a hinged plate;
the upper and lower support members attached to the hinged plate;
the lower support member containing one or more interior storage compartments;
the underside of the lower support member containing an attachment means for attaching the underside of the lower support member to a bicycle frame, wherein the upper and lower support members are removably attached to the hinged plate by means of a tongue-in-groove connection; the attachment means for removably attaching the underside of the lower support member to the bicycle frame is a collar and quick release mechanism in which a seat post is slidably received; and further comprising a clasp to secure the upper and lower support members in the closed position; straps to facilitate the carrying of the bicycle seat when removed from the bicycle frame; an indentation in the front center region of the seat; and ventilation holes in the upper support member.

5. The bicycle seat of claim 4 wherein at least one of the ventilation holes may be used to receive therethrough one or more wires of one or more electronic devices which are stored in one or more of the interior storage compartments.

6. A bicycle seat, comprising:
an upper support member; a lower support member; a hinged plate; and a seat post;
the upper and lower support members attached to the hinged plate;
the lower support member containing one or more interior storage compartments;
the seat post attached to the underside of the lower support member such that the seat post is retractable into the underside of the lower support member when the bicycle seat is removed from the bicycle frame.

7. The bicycle seat of claim 6, wherein the seat post retracts by means of a hinge at its point of attachment to the underside of the lower support member.

8. The bicycle seat of claim 6, further comprising a locking means to secure the upper and lower support members in the closed position.

9. The bicycle seat of claim 8, wherein the locking means is a clasp.

10. The bicycle seat of claim 6, wherein the upper and lower support members are removably attached to the hinged plate by means of a tongue-in-groove connection; and further comprising a clasp to secure the upper and lower support members in the closed position; a handle to facilitate the carrying of the bicycle seat when removed from the bicycle frame; an indentation in the front center region of the seat; and ventilation holes in the upper support member.

11. The bicycle seat of claim 10 wherein at least one of the ventilation holes may be used to receive therethrough one or more wires of one or more electronic devices which are stored in one or more of the interior storage compartments.

* * * * *